(12) United States Patent
Fukui et al.

(10) Patent No.: US 10,775,536 B2
(45) Date of Patent: Sep. 15, 2020

(54) MIRROR WITH DISPLAY DEVICE

(71) Applicant: AGC Inc., Chiyoda-ku (JP)

(72) Inventors: Takashi Fukui, Chiyoda-ku (JP);
Ryuichi Shiraishi, Chiyoda-ku (JP);
Takahiko Akiyama, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 230 days.

(21) Appl. No.: 15/712,970

(22) Filed: Sep. 22, 2017

(65) Prior Publication Data

US 2018/0011229 A1  Jan. 11, 2018

Related U.S. Application Data

(63) Continuation of application No. PCT/JP2016/061460, filed on Apr. 7, 2016.

(30) Foreign Application Priority Data

Apr. 21, 2015  (JP) .................................. 2015-087075

(51) Int. Cl.
*G02B 5/08* (2006.01)
*G02F 1/13* (2006.01)
(Continued)

(52) U.S. Cl.
CPC ............. *G02B 5/0858* (2013.01); *G02F 1/13* (2013.01); *G02F 1/13471* (2013.01);
(Continued)

(58) Field of Classification Search
CPC ............. G02B 5/0858; G02F 1/13471; G02F 1/133553; G02F 1/133512;
(Continued)

(56) References Cited

U.S. PATENT DOCUMENTS 4,202,607 A * 5/1980 Washizuka ........ G02F 1/133308
349/113
4,588,267 A * 5/1986 Pastore ................ B60Q 1/2665
359/636
(Continued)

FOREIGN PATENT DOCUMENTS

| JP | 8-173285 | 7/1996 |
|---|---|---|
| JP | 2002-67806 | 3/2002 |

(Continued)

OTHER PUBLICATIONS

International Search Report dated Jun. 21, 2016 in PCT/JP2016/061460, filed on Apr. 7, 2016 (with English Translation).
(Continued)

*Primary Examiner* — Cassandra Davis
(74) *Attorney, Agent, or Firm* — Oblon, McClelland, Maier & Neustadt, L.L.P.

(57) ABSTRACT

A mirror with display device includes a transparent planar material; and a display device. The transparent planar material has a metallic thin film. A light-shielding part is formed in the transparent planar material so that the transparent planar material has a translucent part. A display part of the display device for displaying an image is bonded to the translucent part via an adhesive layer.

15 Claims, 15 Drawing Sheets

(51) Int. Cl.
*G09F 9/33* (2006.01)
*G09F 23/00* (2006.01)
*G09F 9/30* (2006.01)
*G09F 9/35* (2006.01)
*G02F 1/1335* (2006.01)
*G02F 1/1347* (2006.01)
*G02F 1/1333* (2006.01)

(52) U.S. Cl.
CPC .. *G02F 1/133512* (2013.01); *G02F 1/133553* (2013.01); *G09F 9/30* (2013.01); *G09F 9/33* (2013.01); *G09F 9/35* (2013.01); *G09F 23/00* (2013.01); *G02F 1/133308* (2013.01); *G02F 2001/133331* (2013.01); *G02F 2001/133357* (2013.01); *G02F 2202/28* (2013.01)

(58) Field of Classification Search
CPC .......... G02F 2001/133357; G02F 1/13; G02F 2202/28; G02F 2001/133331; G02F 1/133308; G09F 9/35; G09F 9/30; G09F 23/00; G09F 9/33
USPC .............................................. 40/219
See application file for complete search history.

(56) References Cited

U.S. PATENT DOCUMENTS

| | | | |
|---|---|---|---|
| 7,551,354 B2* | 6/2009 | Horsten | A47G 1/02 359/485.07 |
| 7,589,893 B2* | 9/2009 | Rottcher | G09F 13/12 345/24 |
| 7,805,260 B2* | 9/2010 | Mischel, Jr. | G09F 19/14 348/826 |
| 8,154,418 B2* | 4/2012 | Peterson | B60R 1/12 340/815.4 |
| 8,910,402 B2* | 12/2014 | Mischel, Jr. | G09F 9/00 312/227 |
| 2007/0159316 A1 | 7/2007 | Mischel, Jr. et al. | |
| 2009/0015736 A1* | 1/2009 | Weller | B60R 1/12 349/11 |
| 2009/0085729 A1* | 4/2009 | Nakamura | B60Q 1/2665 340/425.5 |
| 2012/0293723 A1 | 11/2012 | Mischel, Jr. et al. | |
| 2013/0273266 A1 | 10/2013 | Niiyama et al. | |
| 2014/0178619 A1 | 6/2014 | Niiyama et al. | |
| 2015/0203970 A1 | 7/2015 | Mischel, Jr. et al. | |
| 2015/0205109 A1 | 7/2015 | Mischel, Jr. et al. | |
| 2015/0205110 A1 | 7/2015 | Mischel, Jr. et al. | |
| 2016/0002501 A1 | 1/2016 | Niiyama et al. | |

FOREIGN PATENT DOCUMENTS

| | | |
|---|---|---|
| JP | 2002-229494 | 8/2002 |
| JP | 2004-357103 | 12/2004 |
| JP | 2006-50203 | 2/2006 |
| JP | 2007-34061 | 2/2007 |
| JP | 2010-240012 | 10/2010 |
| JP | 2011-71972 | 4/2011 |
| JP | 2011-71973 | 4/2011 |
| JP | 2011-145331 | 7/2011 |
| JP | 5307321 | 10/2013 |
| WO | WO 2005/048784 A1 | 6/2005 |
| WO | WO 2007/062409 A2 | 5/2007 |

OTHER PUBLICATIONS

Written Opinion dated Jun. 21, 2016 in PCT/JP2016/061460, filed on Apr. 7, 2016.

* cited by examiner

MIRROR WITH DISPLAY DEVICE

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/061460 filed on Apr. 7, 2016 and designating the U.S., which claims priority of Japanese Patent Application No. 2015-087075 filed on Apr. 21, 2015. The entire contents of the foregoing applications are incorporated herein by reference.

BACKGROUND OF THE INVENTION

1. Field of the Invention

The disclosure herein generally relates to a mirror with display device, in which the display device is adhered directly to a surface of the mirror.

2. Description of the Related Art

As an example of configuring a mirror and a display device as a unit, a configuration has been known in which a translucent part is formed in a part of the mirror, and the display device is arranged on a back side of the translucent part so that a user see a display surface of the display device while seeing the mirror (See Japanese Unexamined Patent Application Publication No. 2011-71973 and Japanese Unexamined Patent Application Publication No. 2002-67806).

Japanese Unexamined Patent Application Publication No. 2011-71973 discloses a thin display apparatus in which a half mirror is arranged on a front surface side of a thin display device. The half mirror disclosed in Japanese Unexamined Patent Application Publication No. 2011-71973 is provided with display device on a back surface of a glass plate. The half mirror includes a translucent region in which the display device is present, and a light-shielding layer formed in a region which does not have the display device. In the configuration described in Japanese Unexamined Patent Application Publication No. 2011-71973, a metallic thin film layer is arranged on a surface of the glass plate where the display device is present. A transparent film is arranged between the metallic thin film layer and the light-shielding layer. Therefore, intensity of a light passing through the translucent region is small.

Japanese Unexamined Patent Application Publication No. 2002-67806 discloses a mirror for vehicle with display device. In the mirror for vehicle, on an entire front surface of a glass plate, a light transmissive metallic thin film layer for a half mirror is formed. In a part of a back surface of the glass plate, a black paint film is formed so as to form a light transmission window. Furthermore, a liquid crystal display device is arranged at a position facing the light transmission window.

SUMMARY OF THE INVENTION

Technical Problem

In the related art, in a state where the display device is not caused to operate (OFF time), the light-shielding part cannot be made sufficiently black, and a border between the translucent part and the light-shielding part has been visible. Moreover, in the related art, in a state where the display device is caused to operate (ON time), there is a problem that when viewing an image through a transparent planar material (glass plate), due to multiple reflections, a display image becomes indistinct. In order to display a sharp image, the intensity of light of the display device needs to be strong so as to make an intensity of a reflected image relatively smaller.

The present invention was made in view of such a problem, and it is an object of the present invention to provide a mirror with display device, in which in an OFF time of the display apparatus a border between a light-shielding part and a translucent part is not visible, and in an ON time of the display apparatus a sharp image is displayed in a translucent part.

Solution to Problem

According to study by inventors of the present invention, the inventors have found that when the display part of the display device for displaying an image and a transparent planar material are bonded via an adhesive layer, multiple reflections on the surfaces of the display device and the transparent planar material are reduced, and that the above-described problem can be solved, and thereby completed the present invention.

That is, a mirror with display device according to the present invention includes a transparent planar material; and a display device. The transparent planar material has a metallic thin film. A light-shielding part is formed in the transparent planar material so that the transparent planar material has a translucent part. A display part of the display device for displaying an image is bonded to the translucent part via an adhesive layer.

Effect of the Invention

According to the mirror with display device of the present invention, in an OFF time of the display device, a border between the light-shielding part and the translucent part is not visible, and in an ON time of the display device, a sharp image can be displayed on the translucent part.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

Figure 1:
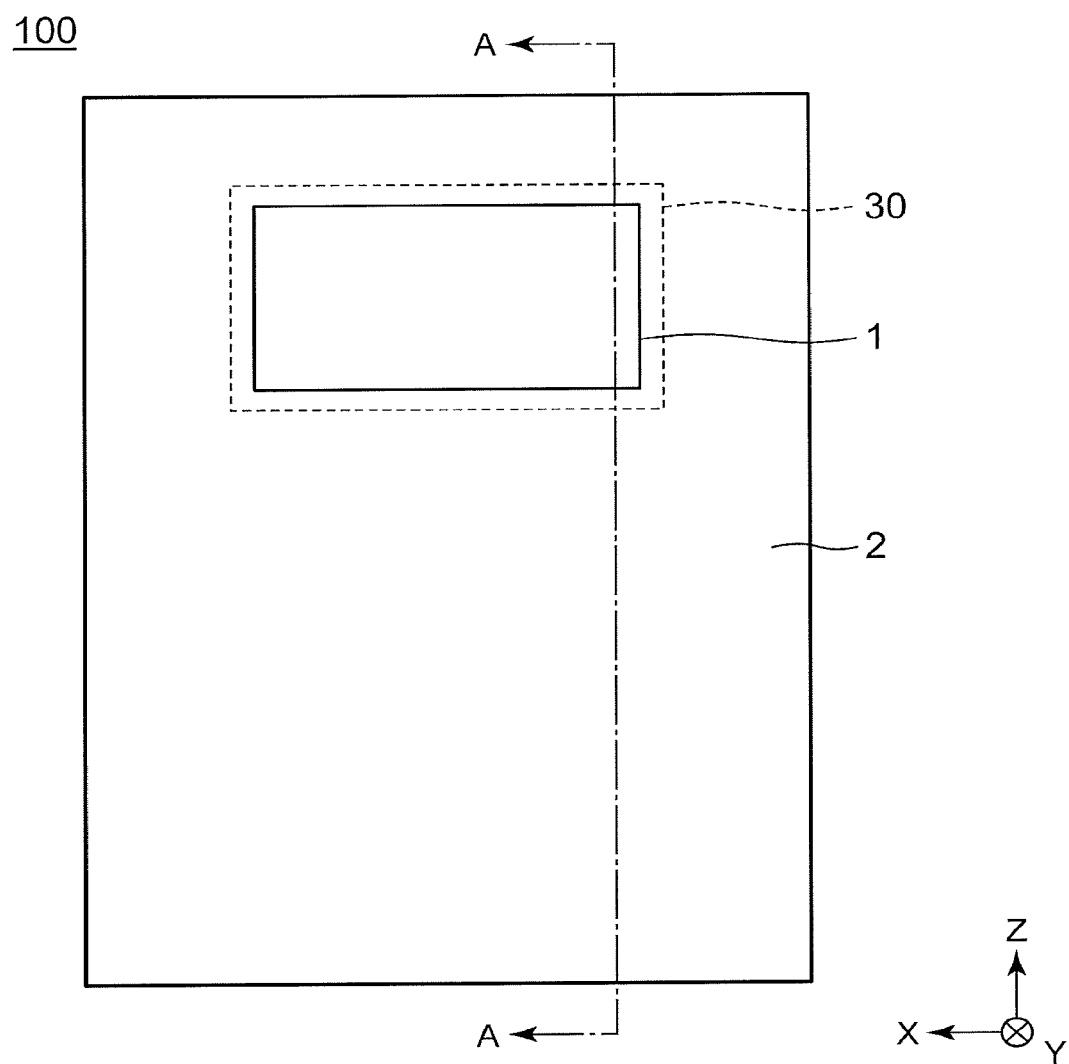
FIG. 1 is a front view depicting a mirror with display device according to an embodiment of the present invention.

In the following, with reference to drawings, embodiments of the present invention will be described. In each drawing, the same reference numeral is assigned to the same component, and redundant explanation will be omitted.

Mirror with Display Device

Figure 2:
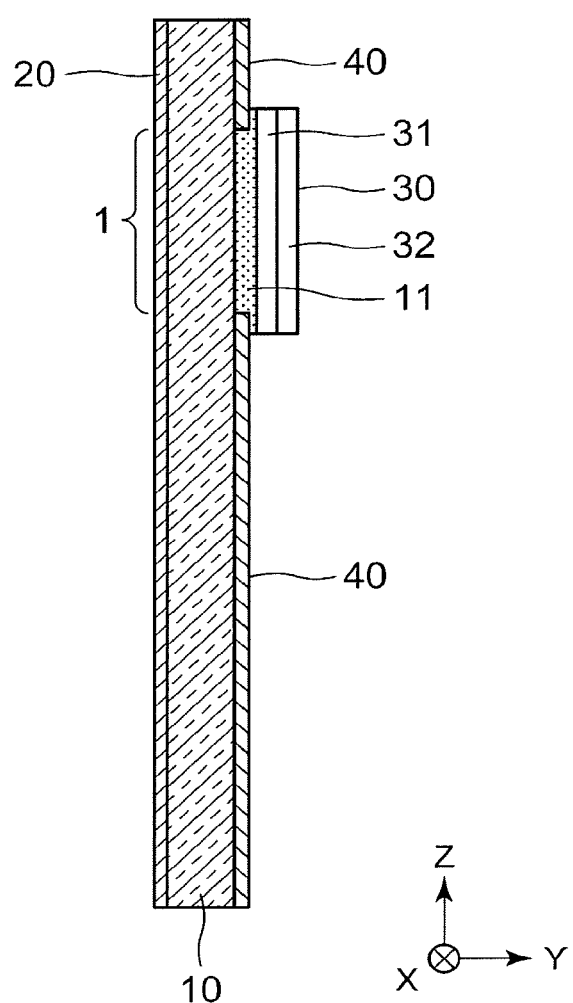
FIG. 2 is a diagram schematically depicting a cross-section cut along a line A-A in FIG. 1.

FIG. 1 is a diagram depicting an example of a mirror with display device 100 according to an embodiment. Moreover, FIG. 2 is a diagram depicting a cross-section cut along a line A-A in FIG. 1. In FIG. 1 and FIG. 2, an X-direction is a direction of a width of the mirror with display device 100, a Y-direction is a direction of a thickness of the mirror with display device 100, and a Z-direction is a direction of a height of the mirror with display device 100.

The mirror with display device 100 according to the embodiment includes, as illustrated in FIG. 1, in a front view, a translucent part 1 and a mirror surface part 2. The mirror with display device 100 according to the embodiment includes, as illustrated in FIG. 2, a transparent planar material 10 in which a metallic thin film 20 is provided on one surface, and a light-shielding part 40 is formed on the other surface so that the translucent part 1 is formed. On the other surface of the transparent planar material 10, a display part for displaying an image from the display device 30 is bonded at a position corresponding to the translucent part 1, via an adhesive layer 11.

For the mirror with display device 100 according to the embodiment, a mirror surface part 2 is constituted in the region where the metallic thin film 20 is arranged on one surface of the transparent planar material 10 and where the light-shielding part 40 is arranged on the other surface, and when the display device is in the ON time and in the OFF time. In the mirror with display device 100 according to the embodiment, when the display device 30 is in the ON time, a display image is displayed in the translucent part 1, and when the display device 30 is in the OFF time, the translucent part 1 becomes a mirror surface. As a result, when the display device is in the OFF time, the border between the translucent part 1 and the mirror surface part 2 is not visible, and an integrated mirror can be obtained.

In the following description, a surface of the transparent planar material 10 on which the display device is provided will be referred to as a back surface, and a surface of the transparent planar material 10 on which the metallic thin film 20 is arranged will be referred to as a front surface.

<Transparent Planar Material>

The transparent planar material 10 is, for example, an inorganic glass such as a soda lime glass, an aluminosilicate glass, an aluminoborosilicate glass, or an alkali-free glass, or a transparent resin, such as a polycarbonate resin, or an acrylic resin. Moreover, the transparent surface may be a laminated glass in which a plurality of glass plates are bonded via an intermediate film, or may be a laminated body in which a glass plate and a transparent resin are bonded via an intermediate film or transparent resins are bonded via an intermediate film. For the intermediate film used in the laminated glass and the laminated body, a publicly known material can be used. For example, the material includes PVB (polyvinyl butyral), EVA (ethylene vinyl acetate) or the like.

A number of the inorganic glasses and transparent resins configuring the laminated glass and the laminated body is not limited. For example, the laminated glass may include three inorganic glass plates.

When the transparent planar material 10 is inorganic glass, the material may be subjected to a surface tempering treatment, such as a chemically tempering treatment or a physically tempering treatment.

The transparent planar material 10 according to the embodiment has a rectangular shape. But, the material may have any shape other than the rectangular shape. Moreover, a thickness of the transparent planar material 10 is, for example, 2 to 6 mm.

The transparent planar material 10 has a metallic thin film 20 and a light-shielding part 40, and enable forming of the light-shielding part 40 is arranged so as to form a translucent part 1. The metallic thin film 20 and the light-shielding part 40 may be arranged on the same surface of the transparent planar material 10, or may be arranged on different surfaces, respectively. In order to reduce the visibility of the border between the translucent part 1 and the mirror surface part 2, the light-shielding part 40 is preferably formed between the metallic thin film 20 and the display device 30.

<Metallic Thin Film>

On one surface of the transparent planar material 10, a metallic thin film 20 is arranged. By arranging the metallic thin film 20 on one surface of the transparent planar material 10, a visible light (for light wavelengths falling within a range of 400 to 600 nm (The same applies to the following.)) is more reflected than in a case of using the transparent planar material 10 alone. Then, when a light-shielding part 40 is arranged on the back surface of the transparent planar material 10, a mirror surface part 2 is formed on the transparent planar material 10.

The metallic thin film 20 is preferably arranged on the front surface of the transparent planar material 10 (a surface that does not face the display part). According to the above-described configuration, the effect of reflecting a visible light becomes more prominent, and a design property of the mirror with display device is enhanced.

The metallic thin film 20 is a film of a metal, a metallic oxide, or a metallic nitride. The metallic film may be configured by a single film or a plurality of films. The metallic thin film 20 may be formed directly on a surface of the transparent planar material 10, or may be formed by adhering a film having the metallic thin film 20 to the transparent planar material 10 via an adhesive layer. In this case, the adhesive layer is not limited.

An average reflectance of the metallic thin film 20 for a visible light is, for example, 10-90%. The average reflectance is preferably greater than 50% and less than or equal to 90% for a case of making a reflected image clearer. The average reflectance is preferably 20-50% in the case of making image transmission of the display device 30 clearer. When the average reflectance falls within a range of 20-50%, a mirror that is excellent in image reproducibility can be obtained with the translucent part 1 for the display device being OFF and the mirror surface part 2. The average reflectance of the metallic thin film 20 for a visible light is preferably 25 to 45% and more preferably 30 to 40% in that a clear image can be displayed on the translucent part 1 when the display device 30 is ON, and a mirror that is excellent in image reproducibility can be obtained with the translucent part 1 for the display device 30 being OFF and the mirror surface part 2. The mirror excellent in image reproducibility indicates reproducibility not to the extent that an image is visible on the mirror surface, but to the extent that color and a shape of the image can be clearly recognized.

The metallic thin film 20 preferably has a high average transmittance for a visible light, and is preferably a film that reflects an infrared light (for light wavelengths falling within a range of 800 nm-2000 nm (The same applies to the following)). By making the average transmittance for a visible light high, it is possible to transmit sufficiently a light emitted from the display device 30 bonded to a back surface (surface facing the display part) via the adhesive layer 11, and to display a clear image. Moreover, by enhancing the reflectance for an infrared light, external heat is not transferred from the transparent planar material 10 to the inside, and a heat damage of the display device 30 can be reduced.

The average transmittance of the metallic thin film 20 for a visible light is preferably 50% or more. When the average transmittance is 50% or more, a clear display image can be displayed on the translucent part 1 when the display device 30 is ON. The average transmittance is preferably 55% or more, and more preferably 60% or more, on the point of improving the clarity of an image. In order to obtain a mirror that is excellent in image reproducibility with the translucent part 1 for the display device 30 being OFF and the mirror surface part 2, the average transmittance of the metallic thin film 20 for a visible light is preferably 80% or less.

An average reflectance of the metallic thin film 20 for an infrared light is preferably 5% or more, and more preferably 10% or more. When the average reflectance for an infrared light is 5% or more, a heat damage of the display device 30 can be reduced.

A deposition method for the metallic thin film 20 includes a sputtering method, a vapor deposition method, a wet coating method, or the like. An appropriate deposition method may be employed according to a material used for the metallic thin film 20. The above-described method is the same in the case of depositing directly on the transparent planar material 10 and in the case of depositing on another film.

A metallic material for the metallic thin film 20 is preferably, Si, Sn, Zn, Al, Ti, In, or Cr. The metallic oxide is preferably an oxide of the above-described metal. The metallic nitride is preferably a nitride of the above-described metal. A typical material for the metallic thin film 20 includes ITO (Indium Tin Oxide), Al, or a cobalt oxide.

A film thickness of the metallic thin film 20, as a whole, is preferably 50-500 nm, and more preferably 100 to 200 nm. When the metallic thin film is configured by a plurality of metallic thin films, a thickness of each metallic thin firm can be set freely, but the film thickness, as a whole, preferably falls within the above-described range.

On the surface of the metallic thin film 20 (on the surface at which the transparent planar material 10 is not provided), a resin thin film (not shown) may be arranged to an extent of not decreasing the above-described spectroscopic characteristics for the metallic thin film 20. Arranging the resin thin film is preferable, because antifouling performance or ease of cleanliness can be improved thereby. The resin thin film includes a fluorine resin, a silicon resin or the like. When the resin thin film layer of fluorine resin is arranged, the resin thin film can be formed by a vapor deposition method, and by adhering films configured by the above-described resin via an adhesive layer.

<Light-Shielding Part>

On one surface of the transparent planar material 10, the light-shielding part 40 is formed so as to have the translucent part 1. A region where the light-shielding part 40 is not formed constitutes the translucent part 1 as viewed from the front surface side of the transparent planar material 10. A region where the light-shielding part 40 constitutes formed is the mirror surface part 2 as viewed from the front surface side of the transparent planar material 10.

The light-shielding part 40 is preferably arranged on the back surface of the transparent planar material 10 (surface facing the display part). According to the above-described configuration, a border between the light-shielding part 40 and the translucent part 1 becomes less prominent, and the design property is enhanced.

A color of the light-shielding part 40 is preferably close to a color of the display surface when the display device 30 is OFF. According to the above-described configuration, the border between the translucent part 1 and the mirror surface part 2 becomes further indistinct when the display device 30 is OFF. As a result, a mirror can be obtained in which the translucent part 1 and the mirror surface part 2, of the mirror with display device 100, are integrated.

When the display device 30 is a liquid crystal display device, the display surface is a color close to black, and the light-shielding part 40 is preferably black.

The light-shielding part 40 preferably has an average transmittance of 1% or less for a visible light (wavelength of light is 400-600 nm), and more preferably 0% substantially. When the average transmittance of the light-shielding part 40 is 1% or less, when viewed from the front surface side of the transparent planar material 10, the back surface cannot be seen, and the light-shielding part 40 functions as a mirror surface sufficiently.

A shape of the translucent part 1 is not limited to a rectangular shape. The shape may be changed freely depending on a size of the display device, a display image of the display device, or the like.

A method of forming the light-shielding part 40 includes, a method of forming directly on the transparent planar material 10, a method of forming by adhering a planar material having a light-shielding part to the transparent planar material 10, a method of adhering a resin film with the average transmittance for a visible light that falls within the above-described range, or the like.

The method of forming directly on the transparent planar material 10 includes, for example, a screen printing using a paint including ceramic pigment, an inkjet printing, or the like.

The forming method of adhering a planar material having a light-shielding part to the transparent planar material 10 includes a method of forming a light-shielding part on another planar material by the above-described method, and adhering the other planar material to the transparent planar material 10 via PVB (polyvinyl butyral) or the like.

The method of adhering a resin film with an average transmittance for a visible light that falls within the above described range includes, for example, a method of adhering a black PET (polyethylene terephthalate) film to the transparent planar material 10 via an adhesive layer.

The number of the translucent parts 1 of the transparent planar material 10, and a position, an area, and a shape for which a translucent part 1 is arranged are not limited. Therefore, the light-shielding part 40 of the mirror with display device 100 is formed to have a configuration according to a desired design with respect to the number of the translucent parts 1, the position, the area, the shape or the like.

<Display Device>

To the back surface of the transparent planar material 10 at the position corresponding to the translucent part 1, a display part for displaying an image of the display device 30 is bonded via the adhesive layer 11. The display device 30 includes, for example, a liquid crystal display device, an organic EL display device, a plasma display device, or the like. The display device 30 displays, for example, an image stored in a storage device (not shown), or an image sent from a computer, a server, or the like connected via a network.

In the mirror with display device 100 according to the embodiment, a liquid crystal display device is used as the display device 30. In the liquid crystal display device, a display panel 31 is bonded to the transparent planar material 10 via the adhesive layer 11. Furthermore, a back light 32 is arranged on the back surface side of the display panel 31.

Because in the mirror with display device 100 according to the embodiment, the display part for displaying an image of the display device 30 is bonded to the transparent planar material 10 via the adhesive layer 11, with respect to the back surface of the translucent part 1 of the transparent planar material 10, a display image displayed on the display device 30 is not readily reflected. As a result, when the display device 30 is ON, a distinct display image can be displayed on a front surface side of the transparent planar material 10.

An area of the display part for displaying an image of the display device 30 is preferably greater than the area of the translucent part. In this case, outer peripheral edges of the display part are arranged so as to overlap with the light-shielding part 40. With the above-described configuration, the outer peripheral edges of the display part become invisible from a front surface of the transparent planar material 10, and thereby an effect that an image displayed on the translucent part 1 appears floating toward the front surface side of the transparent planar material 10 can be obtained.

The display device 30 may include a chassis for protecting the display panel 31 and the back light 32. The chassis is preferably bonded to the light-shielding part 40 via another adhesive layer (not shown) different from the adhesive layer 11. According to the above-described configuration, even when the mirror with display device 100 is viewed from the front surface side of the transparent planar material 10, a bonded part between the chassis and the transparent planar material 10 is not identifiable, and the mirror with display device is excellent in design nature.

<Adhesive Layer>

In the mirror with display device 100 according to the embodiment, the display part for displaying an image of the display device 30 is bonded to the translucent part 1 via the adhesive layer. According to the above-described configuration, in the mirror with display device 100, when the display device 30 is OFF, the translucent part 1 becomes a mirror surface, and a border between the translucent part 1 and the mirror surface part 2 becomes indistinct. As a result, when the display device 30 is OFF, the mirror with display device 100 functions as an integrated mirror. Furthermore, when the display device 30 is ON, on the back surface of the translucent part 1 of the transparent planar material 10, reflection of a display image is reduced. As a result, when the display device 30 is ON, a sharp display image can be displayed on a front surface side of the transparent planar material 10. Furthermore, because an intensity of a light of a display image passing through the translucent part 1 does not readily decrease, an intensity of a light of the display device 30 need not be high. Therefore, heat or power consumption due to a high intensity of light of the display device 30 can be reduced.

The adhesive layer 11 preferably has a shear storage modulus G' within a range of $10^3$ Pa to $10^7$ Pa at 25° C. and at 1 Hz. When the storage shear elasticity G' falls within the above-described range, the adhesive layer 11, the transparent planar material 10 and the display device 30 can be sufficiently wet with a shape of the adhesive layer 11 maintained; thus, the display device 30 and the transparent planar material 10 can be firmly fixed. The shear storage modulus G' of the adhesive layer 11 is more preferably $10^4$ Pa to $10^6$ Pa, and the shear storage modulus G' is further preferably $10^4$ Pa to $10^5$ Pa.

A thickness of the adhesive layer 11 is, for example, preferably 0.03 mm to 2 mm, and more preferably 0.1 mm to 1 mm. If the thickness of the adhesive layer 11 is 0.03 mm or more, when an external force or the like is applied from the front surface side of the transparent planar material 10, the adhesive layer 11 reduces an impact of the external force, and thereby protects the display device 30. Moreover, even if a foreign matter with a size less than the thickness of the adhesive layer 11 enters between the display device 30 and the transparent planar material 10, because the thickness of the adhesive layer 11 does not change, any effect due to an entrance of a foreign matter on visibility can be controlled. Furthermore, from the standpoint of ensuring a visibility of a display part of the display device 30, the thickness of the adhesive layer 11 is preferably 2 mm or less.

Example of Another Mirror with Display Device

Figure 3A:
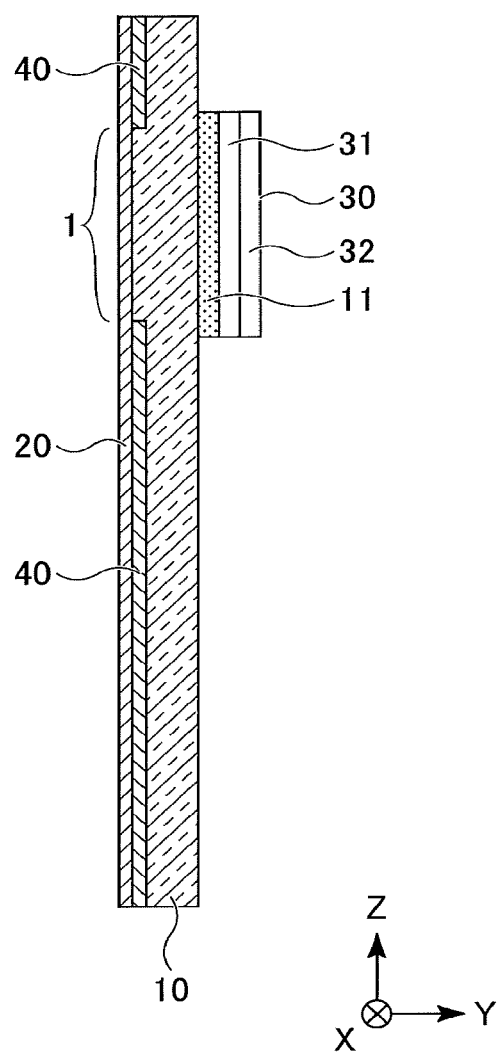
FIGS. 3A and 3B are cross-sectional diagrams depicting examples of a mirror with display device in which a transparent planar material is a single plate.
Figure 3B:
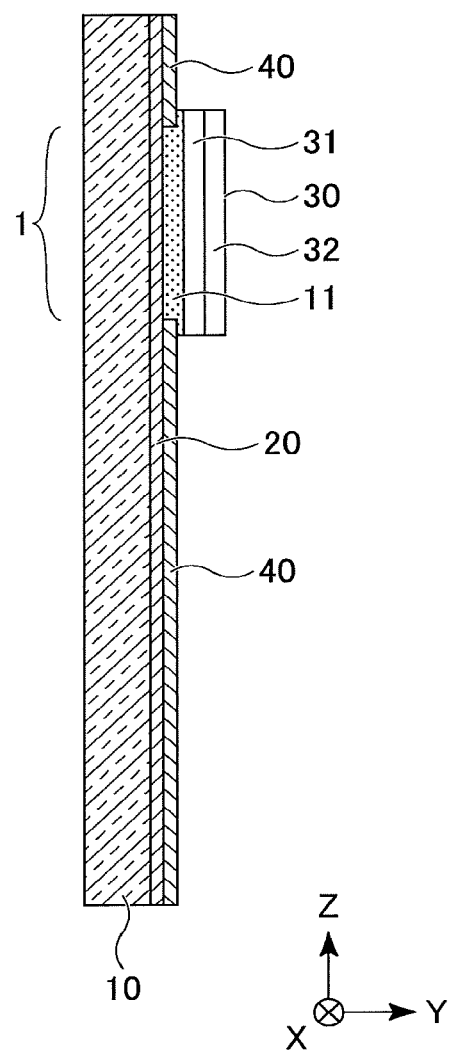

FIG. 3A and FIG. 3B are cross-sectional diagrams depicting examples in which a sheet of the inorganic glass or the transparent resin is used as the transparent planar material 10. FIGS. 4A to 4J are cross-sectional diagrams depicting examples in which a laminated glass or a laminated body is used as the transparent planar material 10. The mirror with display device according to the present invention can take forms as illustrated in the drawings.

A mirror with display device 101A, illustrated in FIG. 3A, includes a metallic thin film 20 and a light-shielding part 40 on a front surface of a transparent planar material 10. A light-shielding part 40 is formed between the metallic thin film 20 and a display device 30. Then, a back surface of the transparent planar material 10 is bonded to a display part of the display device 30 via an adhesive layer 11.

A mirror with display device 101B, illustrated in FIG. 3B, includes a metallic thin film 20 and a light-shielding part 40 on a back surface of a transparent planar material 10. A light-shielding part 40 is formed between the metallic thin film 20 and a display device 30. Then, a back surface of the transparent planar material 10 is bonded to a display part of the display device 30 via an adhesive layer 11.

FIG. 4A to FIG. 4J are diagrams depicting examples of a laminated glass formed by laminating a first glass plate and a second glass plate via an intermediate film of PVB (polyvinyl butyral). In the following description, a glass plate of a front surface (surface that does not face the display part) of the transparent planar material 10 will be referred to as a first glass plate 10A, and a glass plate of a back surface (surface that faces the display part) of the transparent planar material 10 will be referred to as a second glass plate 10B.

Figure 4A:
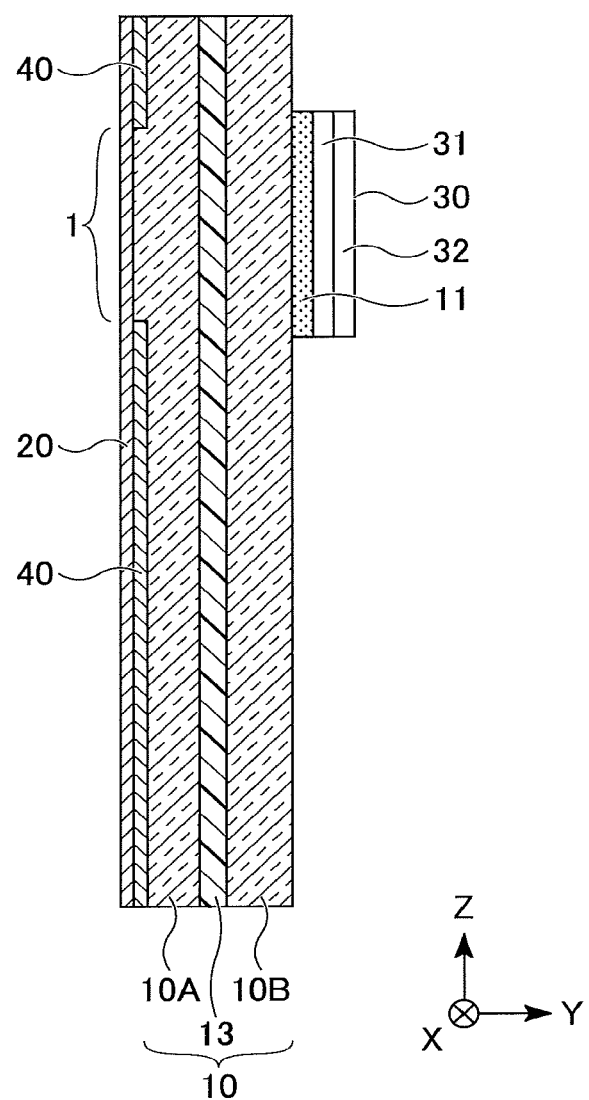
FIGS. 4A to 4J are cross-sectional diagrams depicting examples of a mirror with display device in which a transparent planar material is a laminated body.

The mirror with display device 102A, illustrated in FIG. 4A, includes a metallic thin film 20 and a light-shielding part 40 on a surface, of the first glass plate 10A of the transparent planar material 10, that does not contact the intermediate film 13. The light-shielding part 40 is formed between the metallic thin film 20 and the display device 30. Then, the second glass plate 10B of the transparent planar material 10 is bonded to a display part of the display device 30 via the adhesive layer 11.

Figure 4B:
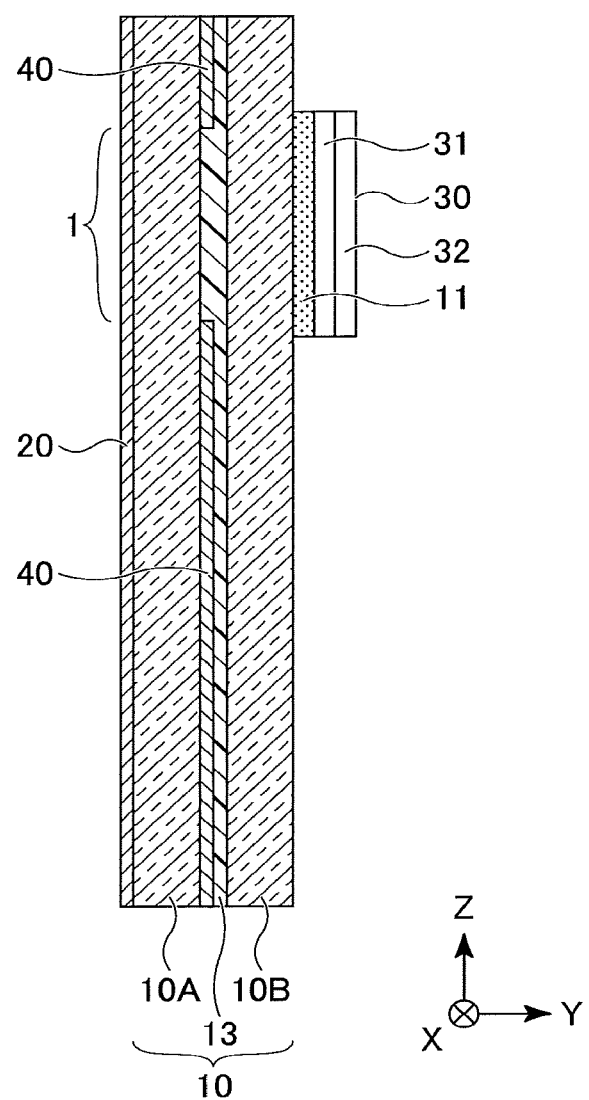

The mirror with display device 102B, illustrated in FIG. 4B, includes a metallic thin film 20 on a surface, of the first glass plate 10A of the transparent planar material 10, that does not contact the intermediate film 13, and includes a light-shielding part 40 on a surface that contacts the intermediate film 13. Then, the second glass plate 10B of the transparent planar material 10 is bonded to a display part of the display device 30 via the adhesive layer 11.

Figure 4C:
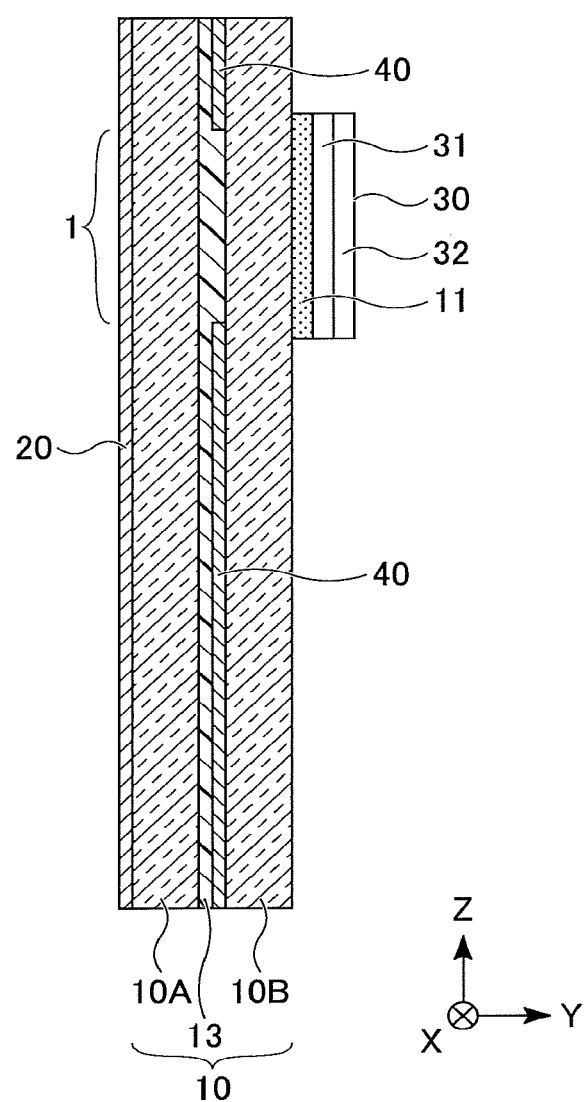

The mirror with display device 102C, illustrated in FIG. 4C, includes a metallic thin film 20 on a surface, of the first glass plate 10A of the transparent planar material 10, that does not contact the intermediate film 13. A light-shielding part 40 on a surface, of the second glass plate 10B of the transparent planar material 10, that contacts the intermediate film 13 is included; the surface which does not contact the intermediate film 13 is bonded to a display part of the display device 30 via the adhesive layer 11.

Figure 4D:
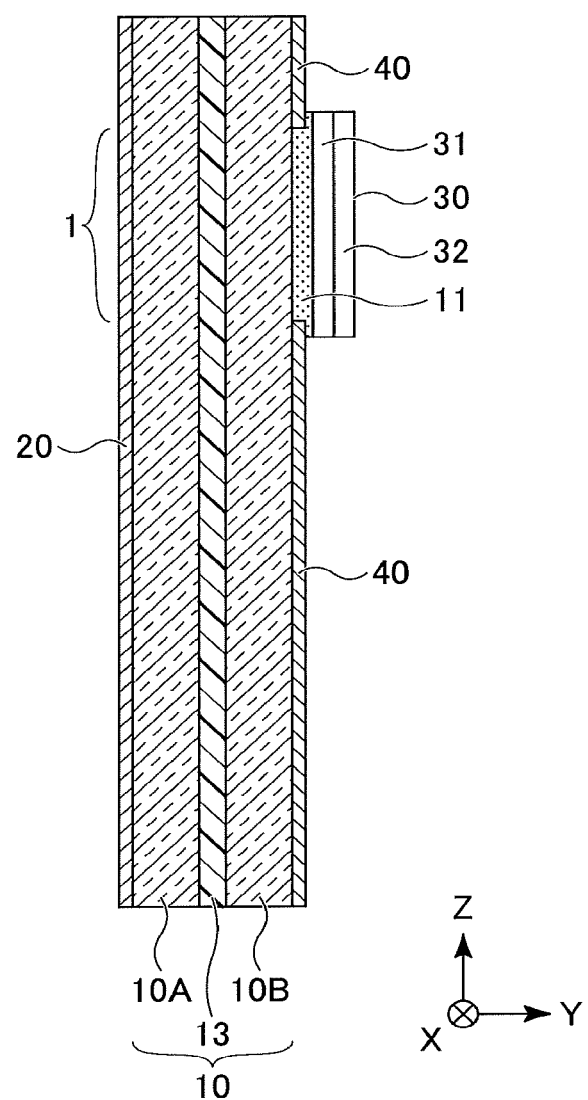

The mirror with display device 102D, illustrated in FIG. 4D, includes a metallic thin film 20 on a surface, of the first glass plate 10A of the transparent planar material 10, that does not contact the intermediate film 13, and includes a light-shielding part 40 on a surface of the second glass plate 10B of the transparent planar material 10 that does not contact the intermediate film 13. The same surface is bonded to a display part of the display device 30 via the adhesive layer 11.

Figure 4E:
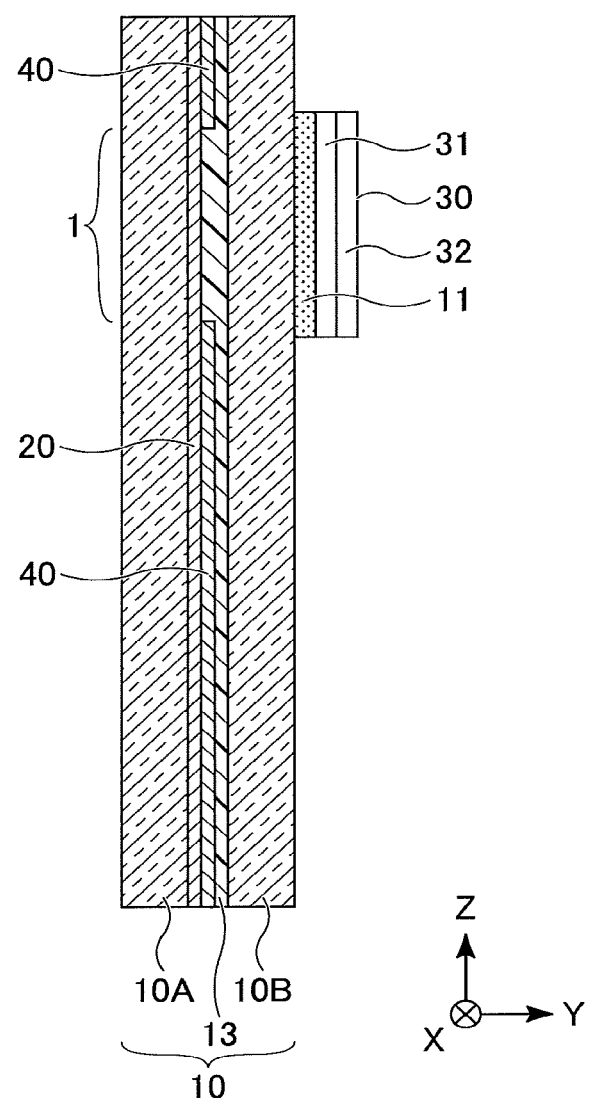

The mirror with display device 102E, illustrated in FIG. 4E, includes a metallic thin film 20 and a light-shielding part 40 on a surface, of the first glass plate 10A of the transparent planar material 10, that contacts the intermediate film 13. The light-shielding part 40 is formed between the metallic thin film 20 and the display device 30. Then, the second glass plate 10B of the transparent planar material 10 is bonded to a display part of the display device 30 via the adhesive layer 11.

Figure 4F:
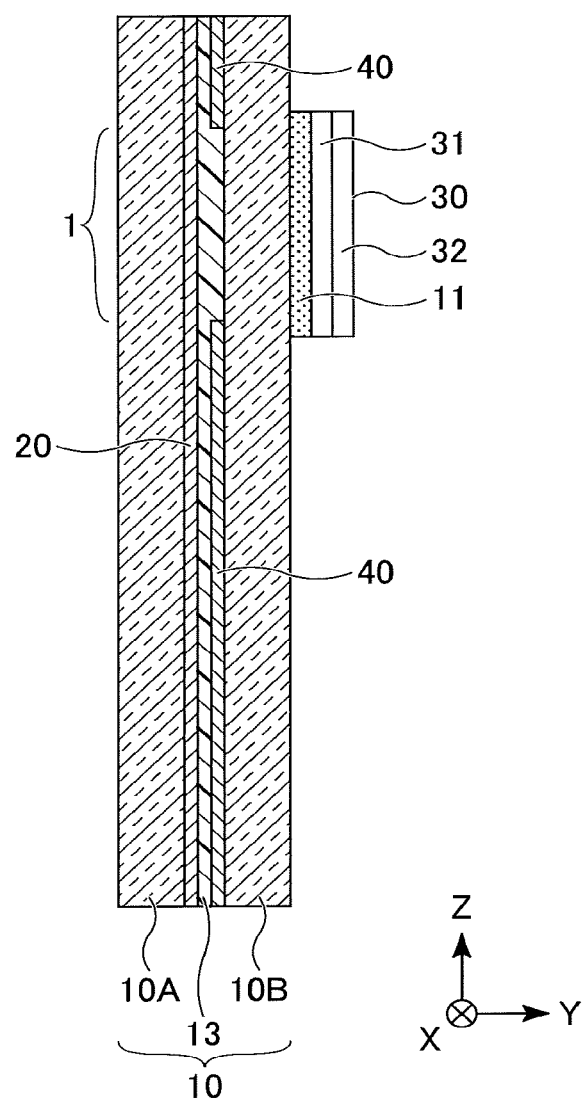

The mirror with display device 102F, illustrated in FIG. 4F, includes a metallic thin film 20 on a surface, of the first glass plate 10A of the transparent planar material 10, that contacts the intermediate film 13, and includes a light-shielding part 40 on a surface of the second glass plate 10B that contacts the intermediate film 13. The surface that does not contact the intermediate film 13 is bonded to a display part of the display device 30 via the adhesive layer 11.

Figure 4G:
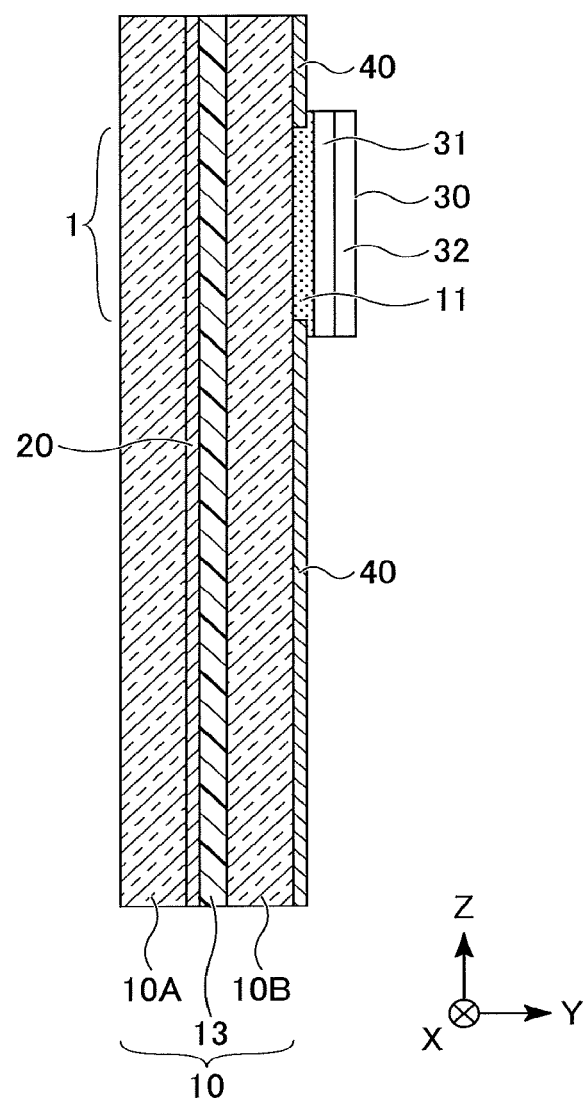

The mirror with display device 102G, illustrated in FIG. 4G, includes a metallic thin film 20 on a surface, of the first glass plate 10A of the transparent planar material 10, that contacts the intermediate film 13, and includes a light-shielding part 40 on a surface of the second glass plate 10B that does not contact the intermediate film 13. The same surface is bonded to a display part of the display device 30 via the adhesive layer 11.

Figure 4H:
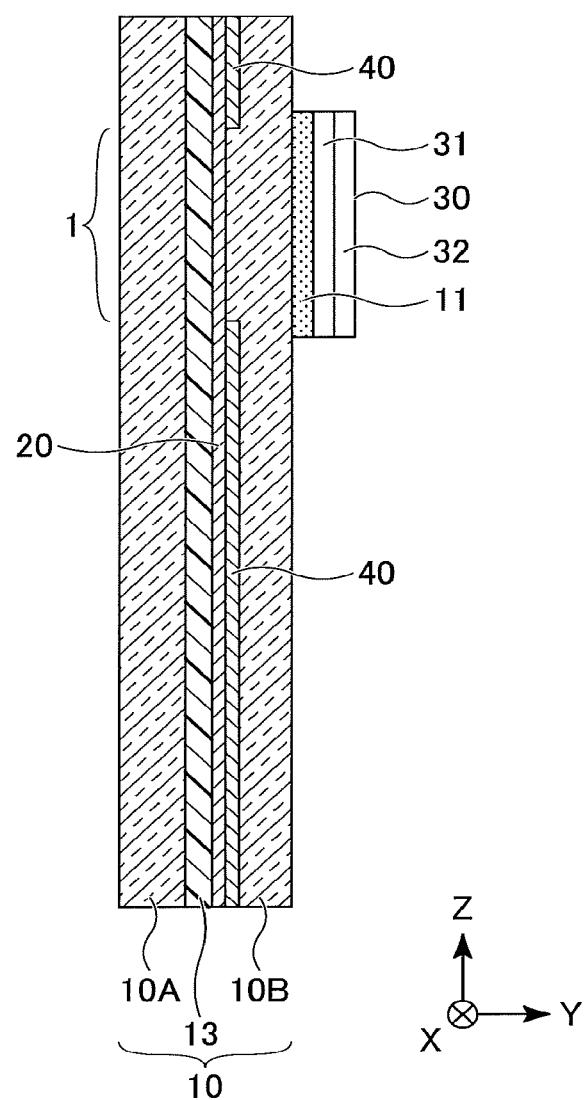

The mirror with display device 102H, illustrated in FIG. 4H, includes a metallic thin film 20 and a light-shielding part 40 on a surface, of the second glass plate 10B of the transparent planar material 10, that contacts the intermediate film 13. The light-shielding part 40 is formed between the metallic thin film 20 and the display device 30. Then, a surface of the second glass plate 10B that does not contact the intermediate film 13 is bonded to a display part of the display device 30 via the adhesive layer 11.

Figure 4I:
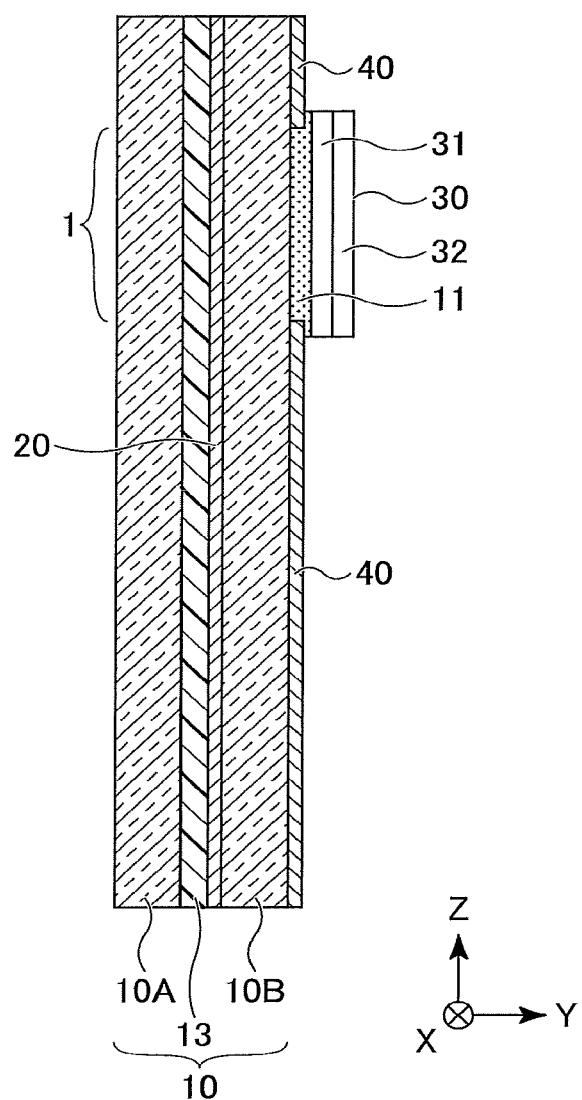

The mirror with display device 102I, illustrated in FIG. 4I, includes a metallic thin film 20 on a surface, of the second glass plate 10B of the transparent planar material 10, that contacts the intermediate film 13, and includes a light-shielding part 40 on a surface that does not contact the intermediate film 13. Then, a surface of the second glass plate 10B that does not contact the intermediate film 13 is bonded to a display part of the display device 30 via the adhesive layer 11.

Figure 4J:
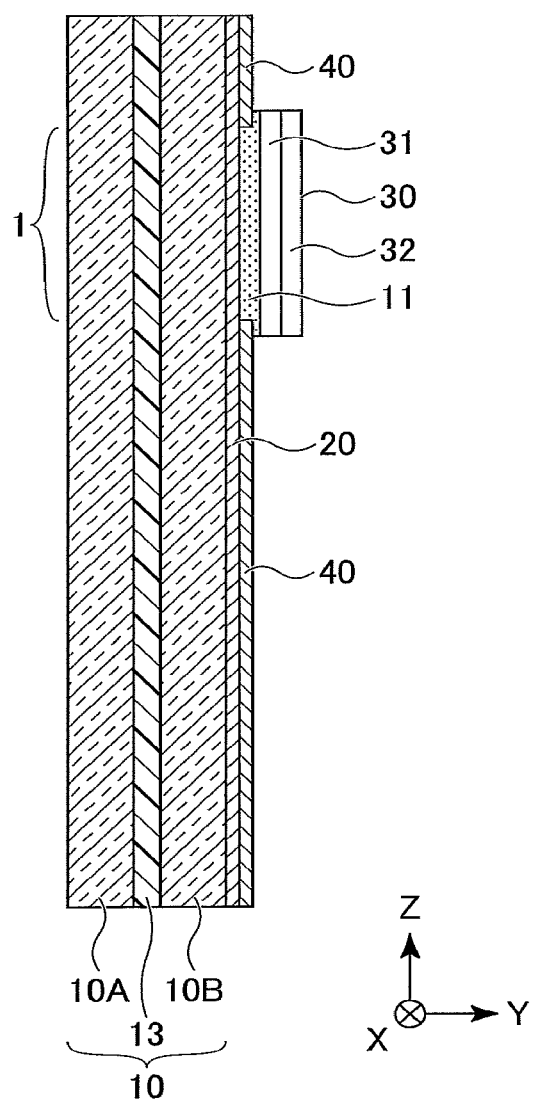

The mirror with display device 102J, illustrated in FIG. 4J, includes a metallic thin film 20 and a light-shielding part 40 on a surface, of the second glass plate 10B of the transparent planar material 10, that does not contact the intermediate film 13. The light-shielding part 40 is formed between the metallic thin film 20 and the display device 30. Then, a surface of the second glass plate 10B that does not contact the intermediate film 13 is bonded to a display part of the display device 30 via the adhesive layer 11.

As described above, the mirror with display device according to the embodiment has been described. However, the present invention is not limited to the embodiments, and various variations and modifications may be made without deviating from the scope of the present invention.

Conventional Mirror with Display Device

Figure 5:
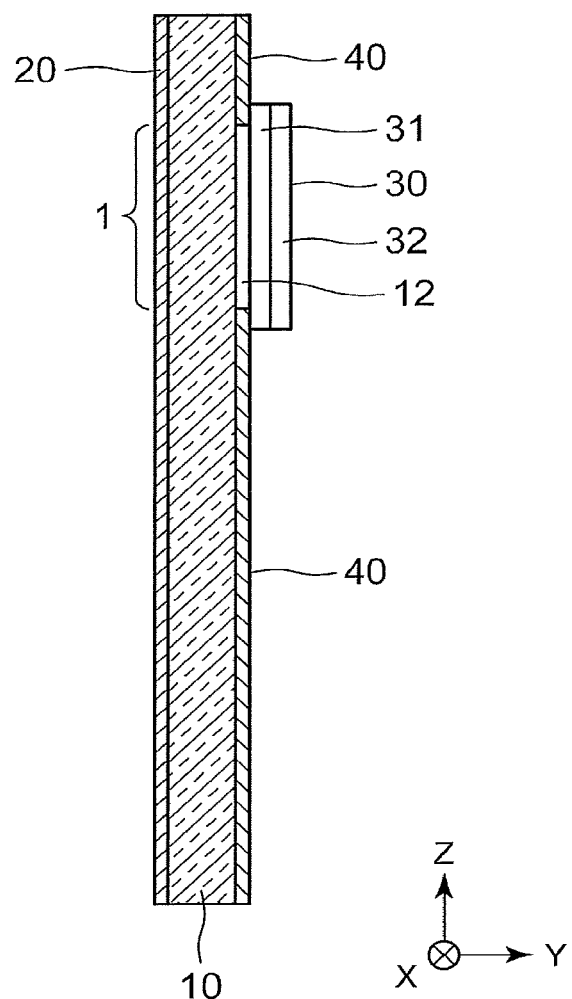
FIG. 5 is a diagram schematically depicting a cross-section of a conventional mirror with display device.

FIG. 5 is a cross-sectional diagram schematically depicting a conventional mirror with display device 200. As illustrated in FIG. 5, the conventional mirror with display device 200 includes a metallic thin film 20 on one surface, and a transparent planar material 10 on which a light-shielding part 40 is formed on another surface such that arrangement of a translucent part 1 can be enabled. On the other surface of the transparent planar material 10, a display device 30 is arranged so as to face the translucent part 1.

Because in the mirror with display device 200 a peripheral part of a chassis of the display device 30 is bonded to the light-shielding part 40 via an adhesive layer which is not shown, an air layer 12 is formed between a back surface side of the translucent part 1 and a display device 30. In the above-described configuration, when the display device 30 is OFF, a border between the translucent part 1 and a mirror surface part 2 becomes distinct. As a result, in the mirror with display device 200, when the display device 30 is OFF, the border between the translucent part 1 and the mirror surface part 2 becomes distinct, and a design property is low. Furthermore, in the above-described configuration, when the display device is ON, multiple reflections occur on a back surface of the translucent part 1 and a front surface of the display device 30. As a result, in the mirror with display device 200, when the display device 30 is ON, a display image viewed from the front surface side of the transparent planar material 10 becomes indistinct. Moreover, in order to increase a light intensity of the display image, a light intensity of the display device 30 is required to be increased.

Example of Arrangement of Mirror with Display Device

The mirror with display device 100 according to the embodiment can be arranged, for example, on a partition wall, a column support, or the like of a shop. A customer can use the mirror with display device for acquiring information about products, floor guide, or the like, which is displayed on the display device 30. Furthermore, when the mirror with display device is arranged in a clothing shop, the appearance customer wearing various products with different colors and designs can be displayed in a virtual manner on the display device 30, such that the customer can examine his or her appearance for various products. Moreover, when the mirror with display device is arranged in a fitting room of a clothing shop, a back shot of the customer who tries on a product is shot by a camera, and is displayed on the display device 30, such that the customer can examine the back shot when trying on a product. A use of the mirror with display device 100 is not limited to the above-described examples.

As described above, according to the mirror with display device 100 of the embodiment, by bonding the display device 30 to a back surface of the translucent part 1 of the transparent planar material 10 via the adhesive layer 11, visibility of an image displayed on the display device 30 is enhanced.

What is claimed is:

1. A mirror with a display device comprising:
a transparent planar material; and
the display device,
wherein the transparent planar material has a metallic thin film on an entire surface of at least one of surfaces of the transparent planar material, and a light-shielding part is formed in the transparent planar material so that the transparent planar material has a translucent part,
wherein a display part of the display device for displaying an image is bonded to the translucent part via an adhesive layer, and
wherein the light-shielding part is formed between the metallic thin film and the display device.

2. The mirror with display device according to claim 1, wherein the metallic thin film is formed on one surface of the transparent planar material, and the light-shielding part is formed on another surface of the transparent planar material.

3. The mirror with display device according to claim 1, wherein an average reflectance of the metallic thin film for a wavelength of 400 nm to 600 nm is from 10% to 90%.

4. The mirror with display device according to claim 1, wherein an average reflectance of the metallic thin film for a wavelength of 400 nm to 600 nm is from 20% to 50%.

5. The mirror with display device according to claim 1, wherein an average reflectance of the metallic thin film for a wavelength of 400 nm to 600 nm is from 30% to 40%.

6. The mirror with display device according to claim 1, wherein an average transmittance of the metallic thin film for a wavelength of 400 nm to 600 nm is 50% or more.

7. The mirror with display device according to claim 1, wherein a shear storage modulus G' of the adhesive layer at 25° C. and at 1 Hz is from $10^3$ Pa to $10^7$ Pa.

8. The mirror with display device according to claim 1, wherein a shear storage modulus G' of the adhesive layer at 25° C. and at 1 Hz is from $10^4$ Pa to $10^6$ Pa.

9. The mirror with display device according to claim 1, wherein a shear storage modulus G' of the adhesive layer at 25° C. and at 1 Hz from $10^4$ Pa to $10^5$ Pa.

10. The mirror with display device according to claim 1, wherein a thickness of the adhesive layer is from 0.03 mm to 2 mm.

11. The mirror with display device according to claim 1, wherein a thickness of the adhesive layer is from 0.1 mm to 1 mm.

12. The mirror with display device according to claim 1, wherein an average transmittance of the light-shielding part for a wavelength of 400 nm to 600 nm is 1% or less.

13. The mirror with display device according to claim 1, wherein the display part for displaying an image of the display device is bonded to a back surface of the transparent planar material at a position corresponding to the translucent part via the adhesive layer.

14. The mirror with display device according to claim 1, wherein the display device is a liquid crystal display apparatus.

15. A mirror with a display device comprising:
a transparent planar material and,
the display device,
wherein the transparent planar material has a metallic thin film on an entire surface of at least one of surfaces of the transparent planar material, and a light-shielding part is formed in the transparent planar material so that the transparent planar material has a translucent part,
wherein a display part of the display device for displaying an image is bonded to the translucent part via an adhesive layer, and
wherein the display device is a liquid crystal display apparatus.

* * * * *